(12) United States Patent
Welch et al.

(10) Patent No.: US 7,258,489 B2
(45) Date of Patent: Aug. 21, 2007

(54) THRUST WASHER AND METHOD OF MANUFACTURE

(75) Inventors: Sean Michael Welch, Clawson, MI (US); Ron Thompson, Howell, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 90 days.

(21) Appl. No.: 10/987,014

(22) Filed: Nov. 12, 2004

(65) Prior Publication Data

US 2005/0135716 A1 Jun. 23, 2005

Related U.S. Application Data

(60) Provisional application No. 60/519,706, filed on Nov. 13, 2003.

(51) Int. Cl.
*F16C 17/10* (2006.01)
(52) U.S. Cl. .................. 384/273; 384/275; 384/294

(58) Field of Classification Search ............... 384/275, 384/273, 272, 294, 288
See application file for complete search history.

(56) References Cited

U.S. PATENT DOCUMENTS

| 5,192,136 A | 3/1993 | Thompson et al. |
| 2003/0128902 A1 | 7/2003 | Kennedy |

*Primary Examiner*—Lenard A. Footland
(74) *Attorney, Agent, or Firm*—Robert L. Stearns; Dickinson Wright PLLC

(57) ABSTRACT

A thrust bearing assembly includes upper and lower bearing halves for journaling a shaft therebetween. At least one thrust washer is arranged on the outer surface of at least one of the bearing halves and has ends which extend beyond and confront the ends of the bearing half on which the thrust washer is mounted to support it against rotational movement relative to the bearing half. A bearing half can have such thrust washers, in which case the other bearing half is narrower and is retained axially by the ends of the thrust washers of the opposing bearing half, or a thrust bearing can be provided on each of the bearing halves in axially opposed relation to one another.

14 Claims, 4 Drawing Sheets

THRUST WASHER AND METHOD OF MANUFACTURE

This application claims priority to U.S. Provisional Patent Application Ser. No. 60/519,706, filed Nov. 13, 2003.

BACKGROUND OF THE INVENTION

1. Technical Field

This invention relates generally to thrust washers or bearing for use in internal combustion engines, and more particularly to three-piece type thrust bearings in which the axially spaced thrust washers are separately made and secured to the associated bearing.

2. Related Art

The thrust washers or bearings for internal combustion engines are typically made as split bearing halves, with each half being formed separately from the other from a respective single piece of bearing material deformed to define an arcuate half bearing and a pair of axially spaced thrust flanges or washers extending radially outwardly of the journal bearing, or alternatively, each formed as a three-piece structure wherein the journal bearing and thrust washer portions are separately formed of the same or different materials and subsequently welded to one another. One-piece flange bearings are costly to manufacture as a number of stamping, forming and bending operations are required. The one-piece construction also limits the selection of materials to be used for the journal bearing and thrust flange portions of the bearing, which typically are of the same material composition since the bearing is made from a single strip of bearing material.

Three-piece thrust bearings are known alternatives to the single-piece type thrust bearings, and have the advantage of enabling the thrust washers to be made of a different material than that of the journal bearing to which they are attached. Typically, the journal bearing is formed along its opposite side edges with a series of notches in which to receive corresponding tabs formed on the thrust washers to prevent the thrust washers from rotating relative to the journal bearing body. The washers are further welded or crimped to prevent relative radial movement of the thrust washers away from the journal bearing on which they are mounted. The requirement of forming notches in the sides of the journal bearings and the additional assembly and securing operations required to hold the thrust washers in place add to the cost and complexity of making such bearings.

It is an object of the present invention to overcome or greatly minimize the inherent limitations of the foregoing thrust washers.

SUMMARY OF THE INVENTION AND ADVANTAGES

A thrust washer constructed according to a presently preferred embodiment of the invention includes an arcuate journal bearing body having a concave inner arcuate bearing surface for journaling a shaft and an opposite convex outer surface for seating the bearing. The body extends in an axial direction of the bearing between opposite side edges and extends circumferentially between spaced ends of the journal bearing. The thrust bearing has at least one and preferably a pair of thrust washers mounted on the journal bearing body. The thrust washers are formed separately from the journal bearing body, preferably of a material different than that used for the journal body. The thrust washers extend circumferentially across the convex outer surface of the journal bearing adjacent to the opposite side edges of the journal bearing. The side edges of the journal bearing are substantially exposed when the thrust bearings are in service. The thrust bearings extend circumferentially beyond the opposite ends of the journal bearing and project radially inwardly so as to overlie and engage the ends of the journal bearing to thereby lock the thrust washers against rotational movement relative to the journal body, as well as locking the thrust washers against relative radial movement. Preferably, the thrust washers are glued, welded, or otherwise secured against relative axial movement by means of a suitable adhesive, a weld joint, a mechanical interlock, or the like.

According to a still further preferred feature of the invention, the flanged thrust bearing is paired with a standard flangeless journal bearing to define a thrust bearing assembly. The accompanying standard flangeless journal bearing is preferably narrower in width than that of the flanged journal bearing between its opposite edges, preferably by an amount equal to the combined thicknesses of the locking tabs of the thrust washers. According to still a further preferred feature of the invention, the locking tabs of the flange thrust washer overlie the edges of the plane journal bearing to further lock the thrust washers against relative axial movement in a direction toward one another when installed in use in an engine.

One advantage of the present invention is that a thrust bearing is provided having relatively simple construction.

Another advantage of the invention is that a thrust bearing can be produced using a set of standard journal bearings free of any specially formed notches or features for retaining the thrust washers, apart from engagement with the circumferentially spaced ends of the bearing.

A further advantage of the present invention is that the journal bearing and thrust washer portions of the assembly can be fabricated of the same or different materials.

Another advantage of the present invention is that the thrust washers are secured against relative rotational and radial movement through simple engagement of the end tabs of the thrust washers with the ends of the journal bearing on which it is mounted.

According to a further advantage of the invention, the thrust washers are retained against relative axial movement in a direction toward one another through engagement of the locking tabs with the side edges of the journal bearing opposite the one on which the thrust washer is mounted.

A further advantage of the present invention is that the thrust washers can be glued to the journal bearing on which they are mounted for purposes of retaining the thrust washer in place during handling and installation, but after which the thrust bearing assembly employs other primary means of retaining the thrust washers against movement relative to the journal bearings when in service.

THE DRAWINGS

These and other advantages of the present invention will be readily appreciated as the same becomes better understood by reference to the following detailed description when considered in connection with the accompanying drawings wherein.

DETAILED DESCRIPTION

Figure 1:
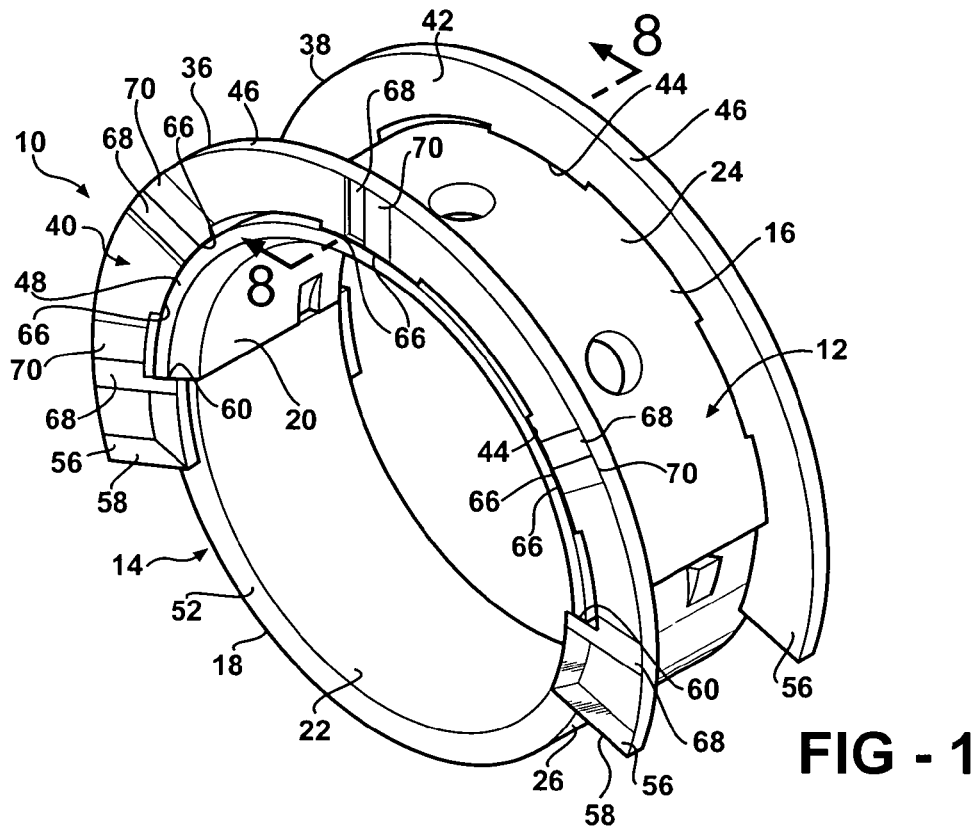
FIG. 1 is a perspective view of a flange bearing assembly constructed according to a first presently preferred embodiment of the invention.
Figure 2:
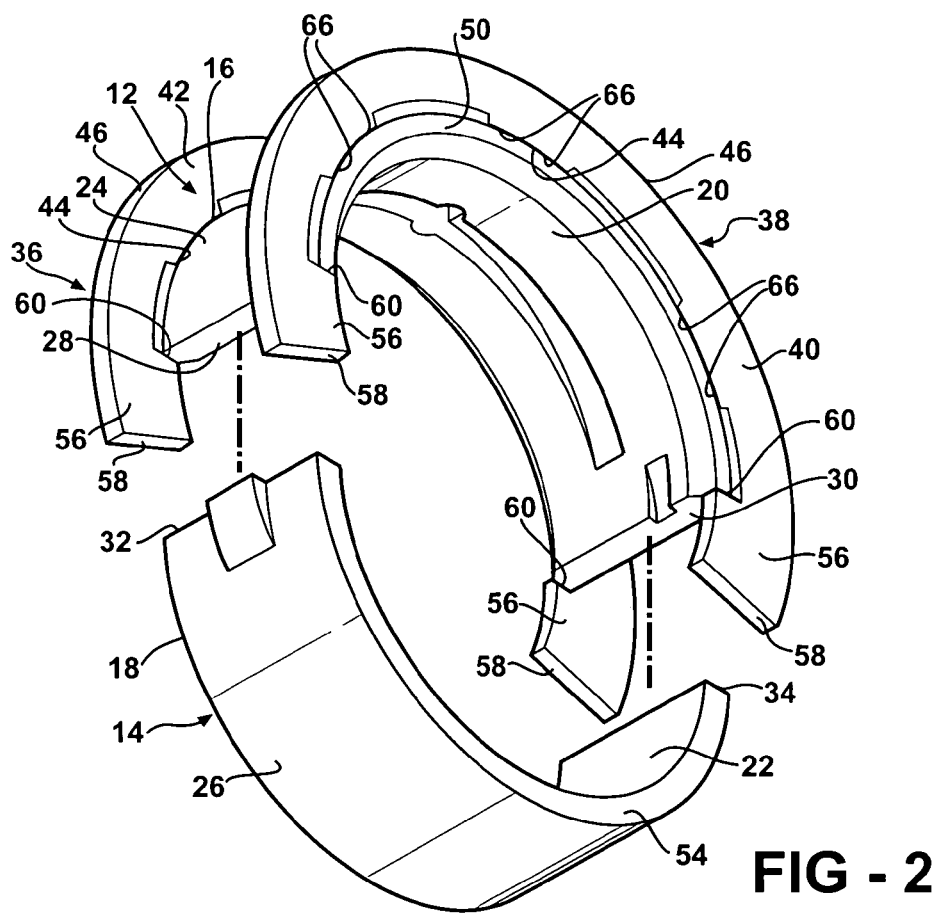
FIG. 2 is a view like FIG. 1, but with the unflanged journal bearing shown separated from the flanged journal bearing.
Figure 3:
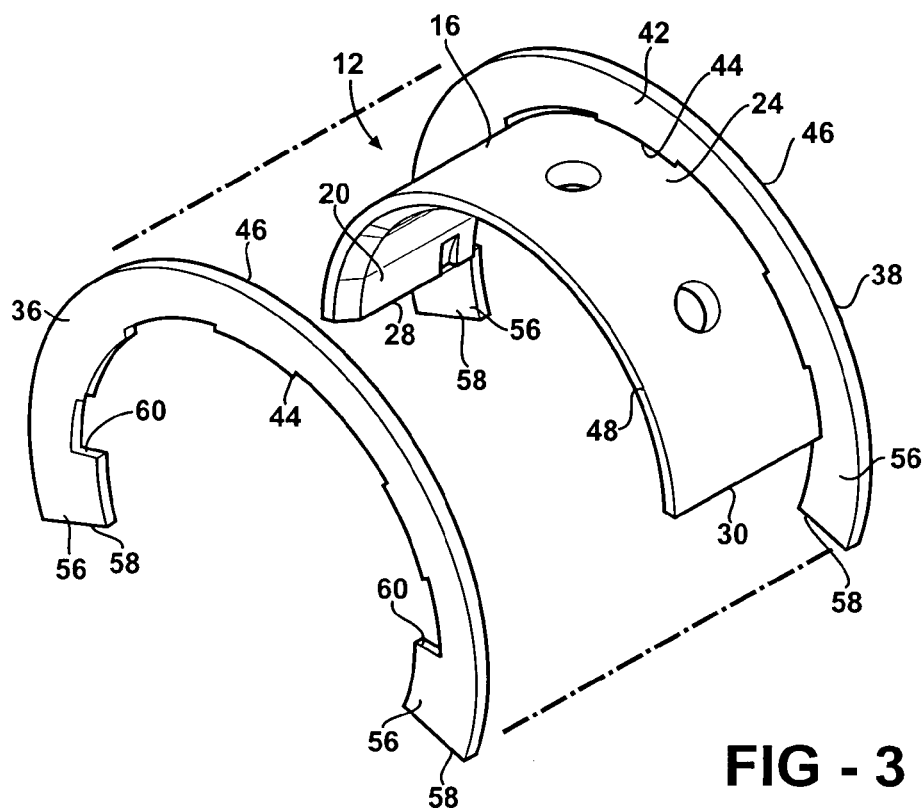
FIG. 3 is an exploded perspective view of the flanged portion of the thrust bearing assembly.

A thrust bearing assembly constructed according to a first presently preferred embodiment of the invention is shown generally at 10 in FIG. 1 and includes an upper bearing half 12 and a complimentary lower bearing half 14. The upper and lower bearing halves 12, 14 each include a journal bearing body 16, 18, respectively, each having an arcuate configuration and each having a concave inner surface 20, 22, respectively and an opposite convex outer surface 24, 26, respectively. Each of the journal bearing bodies extends in the circumferential direction between opposite ends, 28, 30; 32, 34 and the flange bearings are arranged with the concave inner surfaces 20, 22 facing toward one another and disposed about a common axis A of the bearing assembly 10 and with the ends 28, 32; 30, 34 of the journal bearing halves 12, 14 confronting one another to define a circumferentially extending inner bearing surface of the assembly for use in journaling a shaft (not shown) in service.

Each of the journal bearing bodies 16, 18 may be constructed entirely of one material or, more preferably, constructed from a composite or multiple layers of materials which are commonly used in thrust bearing applications and/or engine bearings or which later may be developed. Moreover, the upper 12 and lower 14 journal bearings can collectively be fabricated of the same material or materials, or of different materials, depending upon the requirements of a given application. By way of example, the journal bearings 12, 14 can be fabricated to include a rigid backing of steel onto which one or more layers of other bearing materials are applied to produce a supportive running surface suitable for journaling a shaft according to the intended use. These layers could include, for example, a copper-based bearing layer that may be alloyed with tin and/or bismuth and/or other alloying elements, over which an overlay of another layer of pure tin or the like may be applied to produce a journal bearing part of the bearing assembly conventional to thrust and/or journal bearings in a manner consistent with those presently known or later developed for such applications. Alternatively, an aluminum based bearing material may be clad onto the steel backing, such as an aluminum silicon alloy with or without additional alloying constituents and with or without an overlay of tin or the like as contemplated by present or future aluminum-based journal bearings applications.

Figure 4:
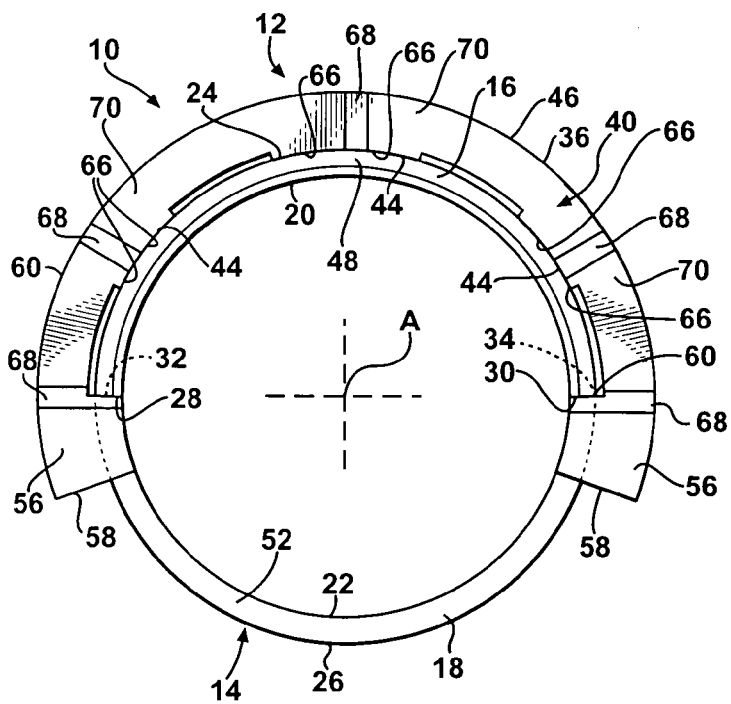
FIG. 4 is an elevational view of the thrust bearing assembly viewed along the axis of the bearing assembly.
Figure 5:
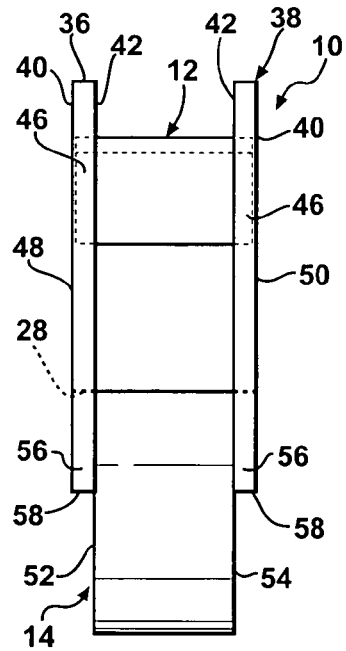
FIG. 5 is a side view of the thrust bearing assembly of FIG. 4.
Figure 6:
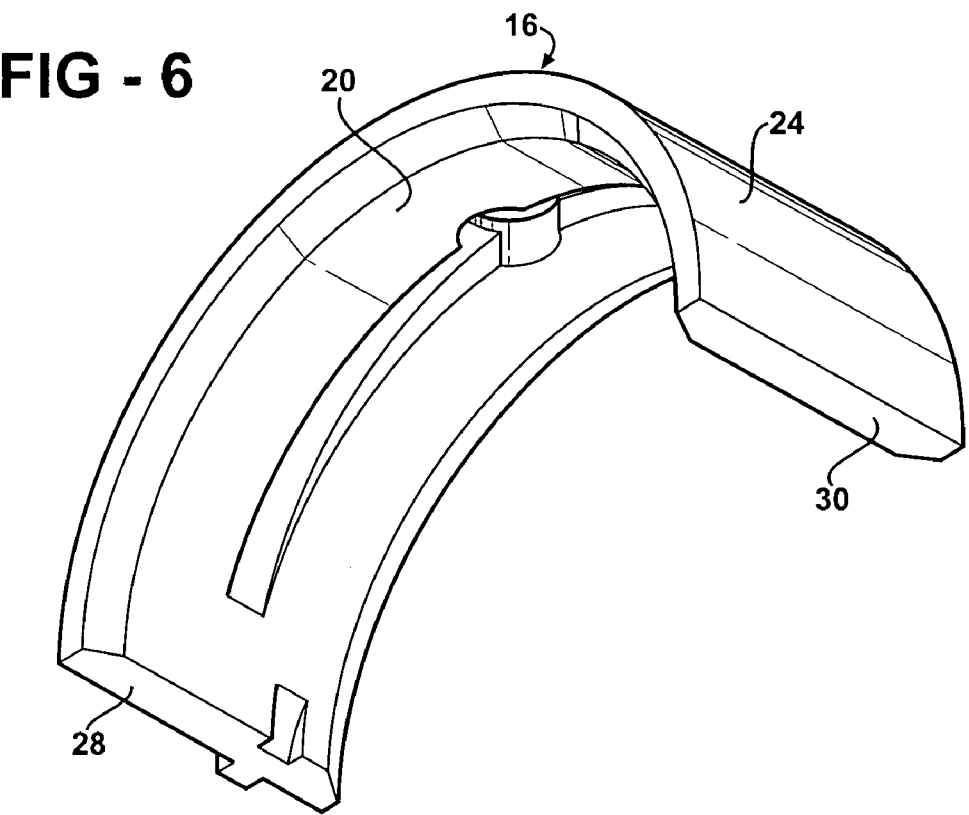
FIG. 6 is a view of the journal bearing portion of the flanged thrust washer.
Figure 7:
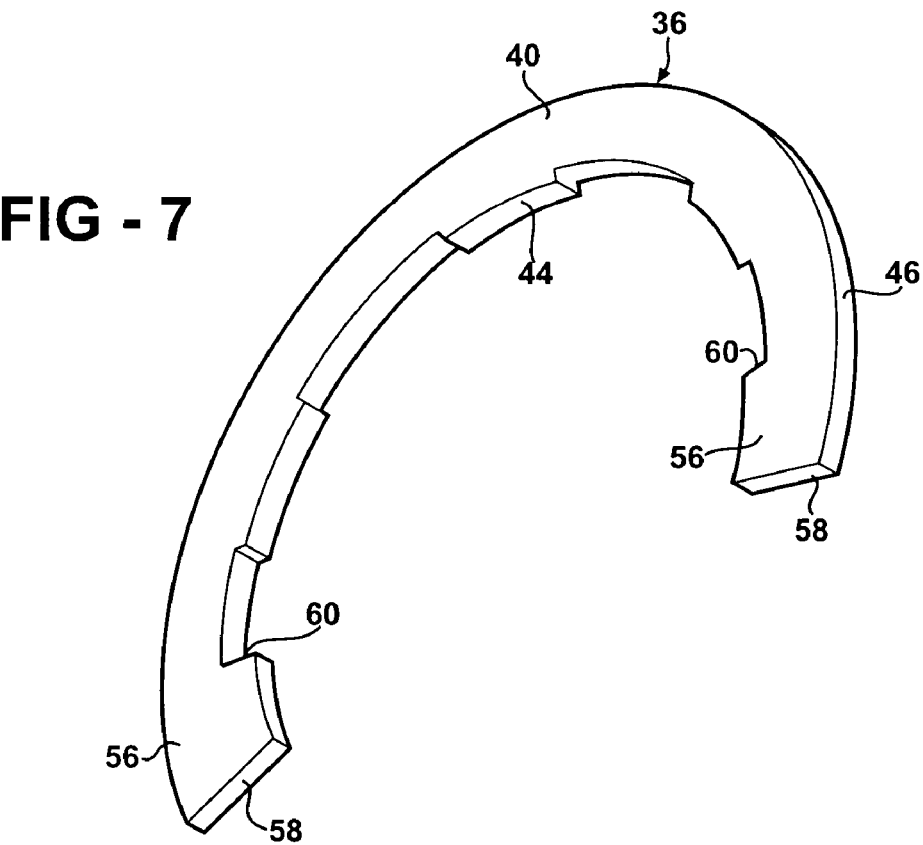
FIG. 7 is an enlarged perspective view of a thrust washer.
Figure 8:
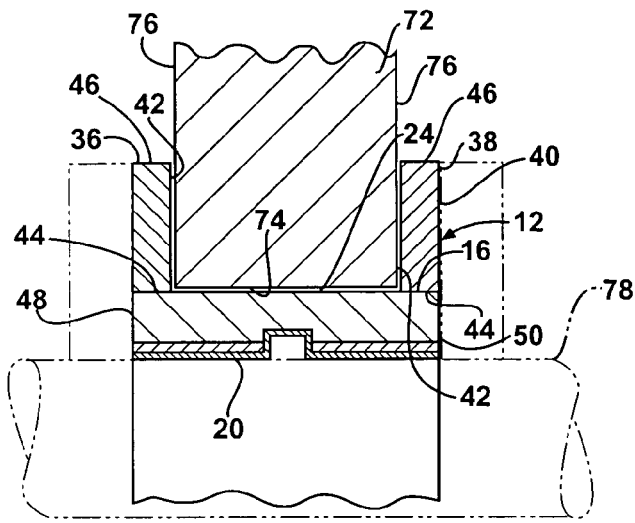
FIG. 8 is an enlarged fragmentary sectional view of the bearing in an installed condition.

The assembly 10 includes thrust washers 36, 38 which are manufactured as separate pieces from that of the journal bearing halves 12, 14 on which they are mounted. The thrust washers 36, 38 may be made from the same or different material as that used to make the journal bearings. For example, the thrust washers 36, 38 may be stamped from sheet stock of aluminum silicon alloy, with or without a steel backing. In the embodiment shown, the thrust washers 36, 38 are preferably fabricated of aluminum-silicon material and are solid throughout without a steel backing. The thrust washers 36, 38 have a generally arcuate shape when viewed along the axis of the bearing assembly (FIG. 4), and a generally planar or flat profile when viewed from the side in a direction perpendicular to the axis (FIG. 5). The thrust washers 36, 38 each have an axially outwardly facing thrust face 40, an axially inwardly facing seating face 42, a radially inner mounting edge 44 and a radially outer free edge 46. As shown best in FIGS. 1, 2, 5 and 8, the radially inner edge 44 is shaped and dimensioned to extend about the outer convex surface 24 or 26 of the journal bearing 12 or 14 on which it is mounted adjacent to, but not overlapping, the axial edge faces 48, 50; 52, 54 of the journal bearing 12 or 14. Retaining or locking tabs 56 are formed at circumferential ends 58 of the thrust washers 36, 38 and extend radially inwardly in overlapping relation with the circumferential end faces 28, 30; 32, 34 of the journal bearing 12 or 14 on which the thrust washer 36, 38 is mounted. The retaining tabs 56 have locking faces 60 which confront the end faces 28, 30; 32, 34 of the thrust bearing 12 or 14 on which they are mounted, supporting the thrust washer 36, 38 against relative rotational movement in either direction relative to the journal bearing 12 or 14 on which it is mounted, as well as supporting the thrust washer 36, 38 against relative radial outward movement. When matched with the relatively narrower lower journal bearing 14, the locking tabs 56, which extend circumferentially beyond the thrust bearing 12, 14 on which they are mounted, overlap axial sidefaces 52, 54 of the unflanged lower bearing 14, supporting the thrust washers 36, 38 against axial movement toward one another beyond the location where the thrust bearings 12, 14 confront the axial side faces 52, 54 of the lower flange bearing 14. The thrust washers 36, 38 are further held against separation from the flange bearing 12 or 14 by provision of a series of glue points 66, which provide sufficient strength to retain the thrust washers 36, 38 against removal during handling and shipping to preclude inadvertent separation. Of course, means for joining other than the glue points may be employed (e.g., welding, brazing, mechanical interference), although the glue points are preferred for sake of low cost and simplicity.

The axially outer thrust face 40 of at least one of the thrust washers 36, 38 is preferably formed with a contoured profile (as illustrated in FIG. 1), including a series of oil drainage grooves 68 spaced circumferentially from one another, and a series of ramped hydrodynamic thrust pad regions 70 adjacent the oil drainage grooves 68 for generating a hydrodynamic action of oil moved across the outer thrust face 24, 26 during rotation of the lobes of a crankshaft, or the like, to minimize direct metal-to-metal contact between the lobes and the thrust washer surfaces to prolong the life of the thrust bearing in known manner. The thrust faces may be similar to those disclosed in prior U.S. Pat. No. 5,192,136. It is noted that one set of the oil grooves 68 are formed at the opposite sides of the thrust washer 36, 38 adjacent the locking tabs 56 in a plane passing through the centerline axis A of the journal bearing assembly 10.

In use, the assembled three-piece thrust washer assembly 10 is installed in an engine block 72, or the like, with the convex backside surface 24, 26 of the journal bearing 10 seated in a concave seat 74 of block, and the thrust washers 36, 38 extend radially outwardly and are saddled with their axially inner backside surfaces 20, 22 confronting corresponding abutment surfaces 76 of the block 72 to support the thrust washers 36, 38 against axial inner displacement beyond their seated position against the block 72. Preferably, the glue points 66 are sufficiently weak in their bonding strength to enable the thrust washer to be displaced, if necessary, axially inward of the initial bond location to achieve full, stress-free seating against the abutment surfaces 76 of the block 72 without stressing the overall bearing than might otherwise occur if the thrust washers 36, 38 were formed of one piece or otherwise bonded strongly and immovably to the journal bearing body 12. The un-flanged, relatively narrower lower journal bearing 14 is mounted opposite the upper flanged bearing 12 and is seated in an appropriate support, such as a bearing cap (not shown) so as to encircle and journal a rotatable shaft 78.

Figure 10:
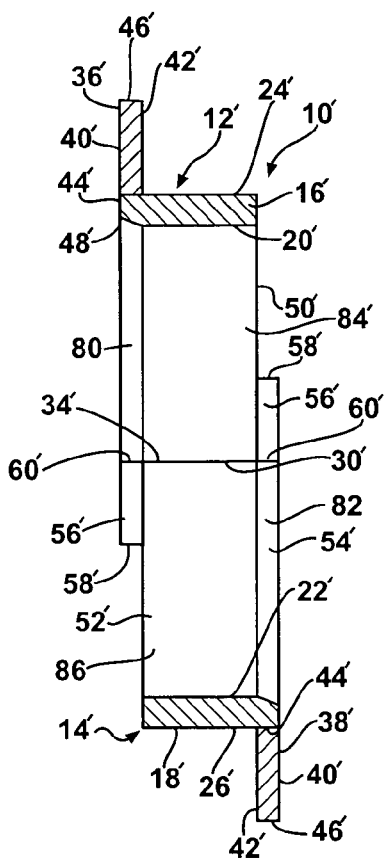
FIG. 10 is a side view of the alternative bearing assembly of FIG. 8.
Figure 9:
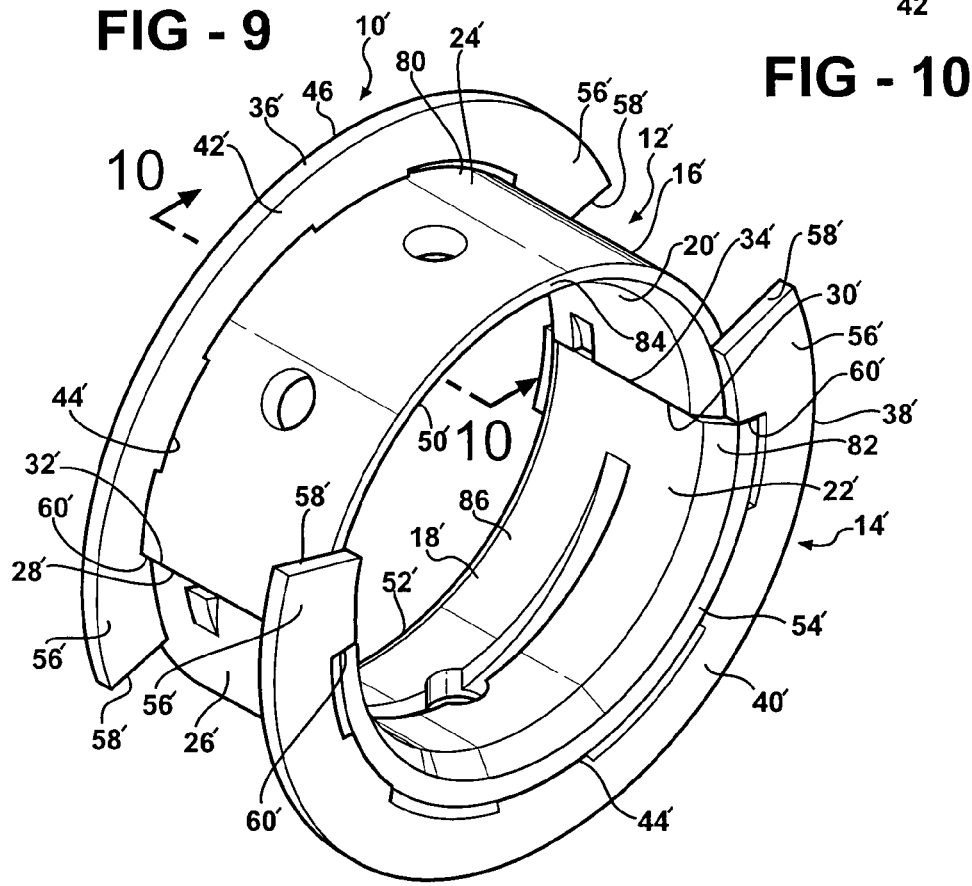
FIG. 9 is a perspective view of an alternative embodiment of the invention.

FIGS. 9 and 10 show an alternative embodiment to the invention, wherein the same basic approach is taken in forming a flange bearing assembly, except that the upper and lower journal bearing bodies 12', 14' are of the same width, but are assembled in axially offset relation to one another such that one edge 48' of the upper journal bearing 12' overhangs the associated edge 52' of the lower journal bearing 14', and the opposite edge 54' of the lower journal bearing overhangs the associated edge 50' of the upper journal bearing 12', as best illustrated in FIGS. 9, 10. A thrust washer 36', 38' manufactured in the manner described above is attached to the overhung edge regions 80, 82 of the upper and lower flange bearings 12', 14', such that the upper journal bearing 12' is mounted with a single thrust washer 36' on its axially overhung end region 80, and the lower journal bearing 14' is likewise provided with a single thrust washer 38' on its axially overhung end region 82, with the retaining tab portions 56' of the thrust washers 36', 38' extending around the overhung circumferential ends 28', 30'; 32', 34' of the journal bearings 12', 14' on which they are mounted and further overlapping the axially inset end 84, 86' of the opposite journal bearing. As shown best in FIG. 10, the amount by which the journal bearings 12', 14' are overhung is preferably equal to the thickness of the thrust washers 36', 38'. Such a bearing is useful in applications where there is a thrust load applied in axially opposite directions, and primarily to the upper half of the bearing assembly in one direction, and the lower half of the bearing assembly in the opposite direction, such as in some pull/pull-type clutch applications. In practice, the upper and lower halves 12', 14' are preferably identically constructed, with the lower bearing half being reversed in its orientation to locate the thrust washer on the axially opposite side as that of the thrust washer of the upper journal bearing.

Obviously, many modifications and variations of the present invention are possible in light of the above teachings. It is, therefore, to be understood that within the scope of the appended claims, the invention may be practiced otherwise than as specifically described.

We claim:

1. A thrust bearing comprising:
   an arcuate bearing body having a convex outer surface extending circumferentially between opposite spaced ends and axially between opposite side edges, and a concave inner bearing surface opposite said outer surface;
   at least one thrust washer separately formed from said bearing body and having a radially inner concave edge and axially opposite faces extending circumferentially between opposite spaced ends;
   wherein said inner concave edge extends circumferentially across said convex outer surface of said bearing body and where said ends of said at least one thrust washer extend beyond and abut said ends of said bearing body;
   wherein said inner concave edge is secured by a joint to said convex outer surface of said bearing body to secure said at least one thrust washer against axial movement relative to said bearing body; and
   wherein said joint comprises a glue joint.

2. A thrust bearing assembly, comprising:
   upper and lower bearing halves, each bearing half having a convex outer surface extending circumferentially between opposite spaced ends and axially between opposite side edges, and a concave inner bearing surface opposite said outer surface;
   at least one thrust washer associated with at least one of said upper and lower bearing halves having a radially inner concave edge and axially opposite faces extending circumferentially between opposite spaced ends;
   wherein said inner concave edge of said at least one thrust washer extends circumferentially across said convex outer surface of said associated bearing halve and where said ends of said at least one thrust washer extend beyond and abut said ends of said associated bearing halve; and
   where said ends of said at least one thrust washer overlap one of said side edges of said other of said bearing halves.

3. The assembly of claim 2 wherein each of said upper and lower bearing halves has at least one thrust washer associated with it.

4. The assembly of claim 3 wherein said at least one thrust bearing associated with said upper bearing half and said at least one thrust bearing associated with said lower bearing half are arranged on axially opposite sides of one another with respect to the assembled bearing halves.

5. The assembly of claim 3 wherein said ends of said at least one thrust bearing associated with said upper bearing half overlap one of said side edges of said lower bearing half and wherein said ends of said at least one thrust bearing associated with said lower bearing half overlap one of said side edges of said lower bearing half.

6. A thrust bearing assembly comprising:
   upper and lower bearing halves, each bearing half having a convex outer surface extending circumferentially between opposite spaced ends and axially between opposite side edges, and a concave inner bearing surface opposite said outer surface;
   at least one thrust washer associated with at least one of said upper and lower bearing halves having a radially inner concave edge and axially opposite faces extending circumferentially between opposite spaced ends;
   wherein said inner concave edge of said at least one thrust washer extends circumferentially across said convex outer surface of said associated bearing halve and where said ends of said at least one thrust washer extend beyond and abut said ends of said associated bearing halve;
   wherein said one of said associated upper and lower bearing halves has two of said thrust washers associated with it; and
   wherein said one of said upper and lower bearing halves has a width between its opposite edges that is greater in dimension that that of the other of said bearing halves.

7. The assembly of claim 6 wherein said ends of said thrust washers overlap onto said edges of said other of said bearing halves.

8. The assembly of claim 7 wherein said other of said bearing halves is retained against axial movement relative to said one of said bearing halves by engagement with said ends of said thrust washers.

9. The assembly of claim 8 wherein said thrust washers are supported against relative movement in the circumferential direction relative to said one bearing half by engagement of said ends of said thrust washers with said ends of said one bearing half.

10. The assembly of claim 9 wherein said thrust washers are secured by a joint to said convex outer surface of said one bearing half to secure said washers against axial movement relative to said one bearing half.

11. A thrust bearing assembly comprising:
   upper and lower bearing halves, each bearing half having a convex outer surface extending circumferentially between opposite spaced ends and axially between opposite side edges, and a concave inner bearing surface opposite said outer surface;
   at least one thrust washer associated with at least one of said upper and lower bearing halves having a radially inner concave edge and axially opposite faces extending circumferentially between opposite spaced ends;
   wherein said inner concave edge of said at least one thrust washer extends circumferentially across said convex outer surface of said associated bearing halve and where said ends of said at least one thrust washer extend beyond and abut said ends of said associated bearing halve;
   wherein said one of said associated upper and lower beating halves has two of said thrust washers associated with it; and
   wherein said other of said upper and lower bearing halves is free of thrust washers.

12. A thrust bearing assembly, comprising:
   a first bearing half having a pair of thrust washers mounted thereon adjacent opposite axial edges of said first bearing half; and
   a second bearing half arranged radially opposite said first bearing half and being free of thrust washers.

13. The assembly of claim 12, wherein said second bearing half has an axial width less that that of said first bearing half.

14. A thrust bearing assembly comprising:
   a first bearing half having a pair of thrust washers mounted thereon adjacent opposite axial edges of said first bearing half;
   a second bearing half arranged radially opposite said first bearing half and being free of thrust washers wherein said second bearing half has an axial width less that that of said first bearing half; and
   wherein said thrust washers overlap onto said opposite axial edges of said second bearing half when said first and second bearing halves are assembled with one another for operation in journaling a shaft therebetween.

* * * * *